United States Patent [19]

MacMahon

[11] 3,764,976
[45] Oct. 9, 1973

[54] PEDAL MOUNTED SIGNAL LIGHT

[75] Inventor: Paul H. MacMahon, Arlington, Va.

[73] Assignees: David H. Williams, Jr.; Kenneth V. Curry, both of Hanover, Pa.; Arthur A. Kimball, Arlington, Va.; Donald L. Shephard, Delray Beach, Fla.; part interest to each

[22] Filed: June 14, 1971

[21] Appl. No.: 152,991

Related U.S. Application Data

[63] Continuation of Ser. No. 771,475, Oct. 29, 1968, abandoned.

[52] U.S. Cl............... 340/87, 240/7.55, 340/81 R, 340/134, 340/321
[51] Int. Cl................................................ B62j 5/00
[58] Field of Search............ 340/134, 87; 240/7.55

[56] References Cited
UNITED STATES PATENTS
2,732,540   1/1956   MacMahon........................ 340/87
2,185,600   1/1940   McComb........................... 240/7.55

Primary Examiner—John W. Caldwell
Assistant Examiner—Kenneth N. Leimer
Attorney—Bacon & Thomas

[57] ABSTRACT

A translucent casing adapted to replace the outer end plate of a conventional bicycle pedal and having batteries, lights and a gravity actuated switch therein. The casing is preferably red in color, to glow when the lights are on. The switch is actuated by merely inverting the pedal on its customary spindle and a cam on that spindle causes the lights to blink. Exterior connections on the casing permit recharging the batteries while they remain in the casing.

6 Claims, 8 Drawing Figures

PATENTED OCT 9 1973 3,764,976
SHEET 1 OF 2
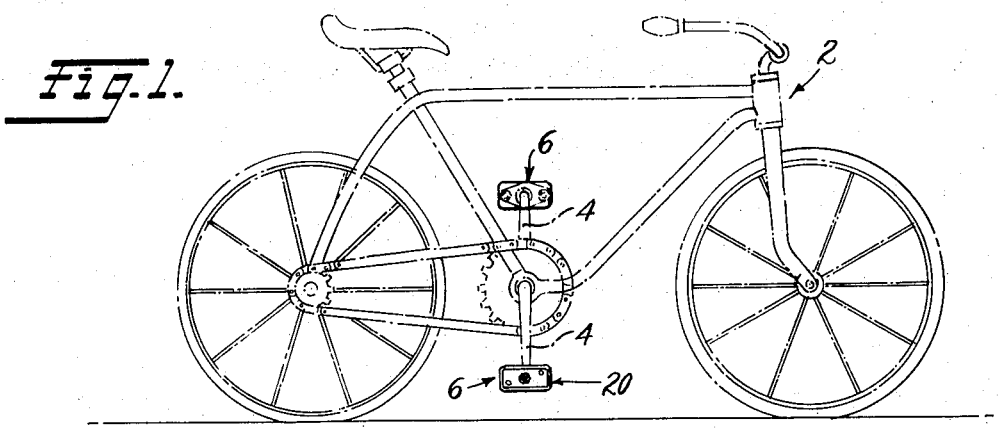
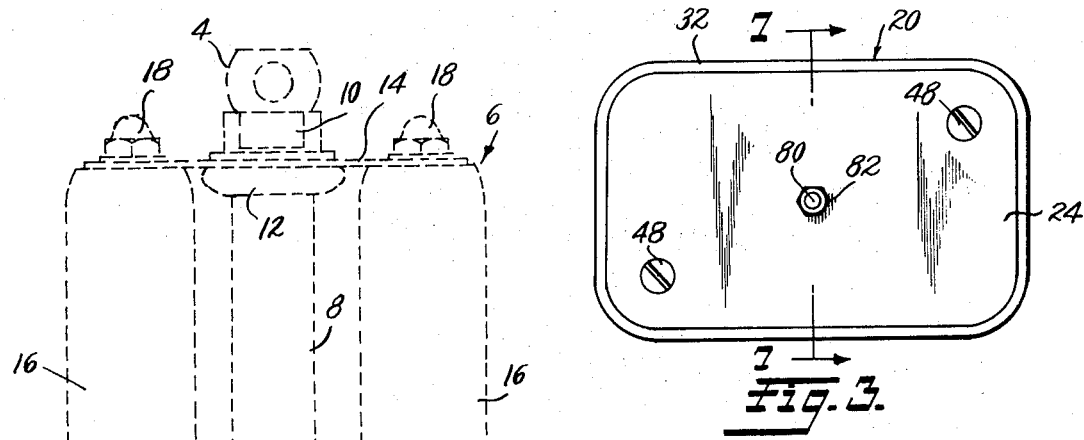
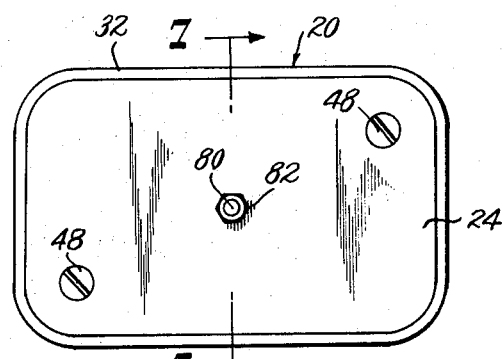
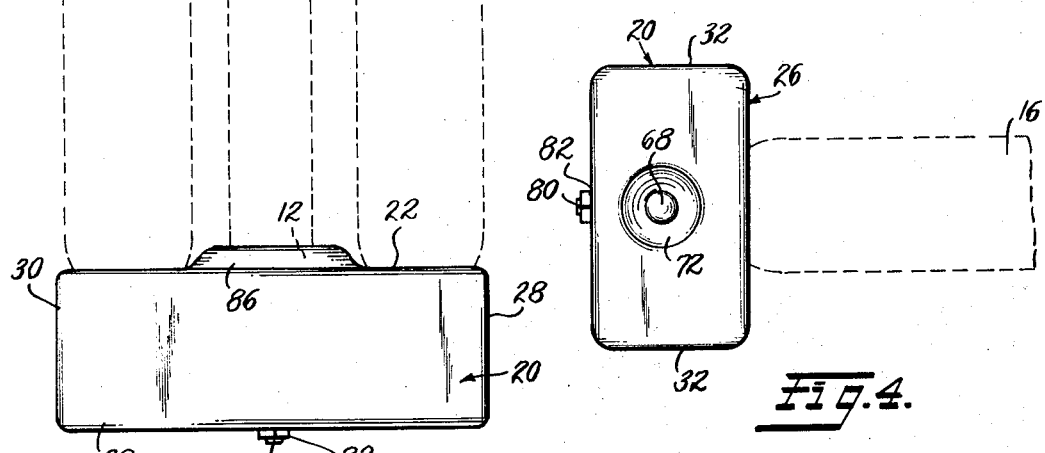
INVENTOR.
PAUL H. MacMAHON
BY
Bacon & Thomas
ATTORNEYS

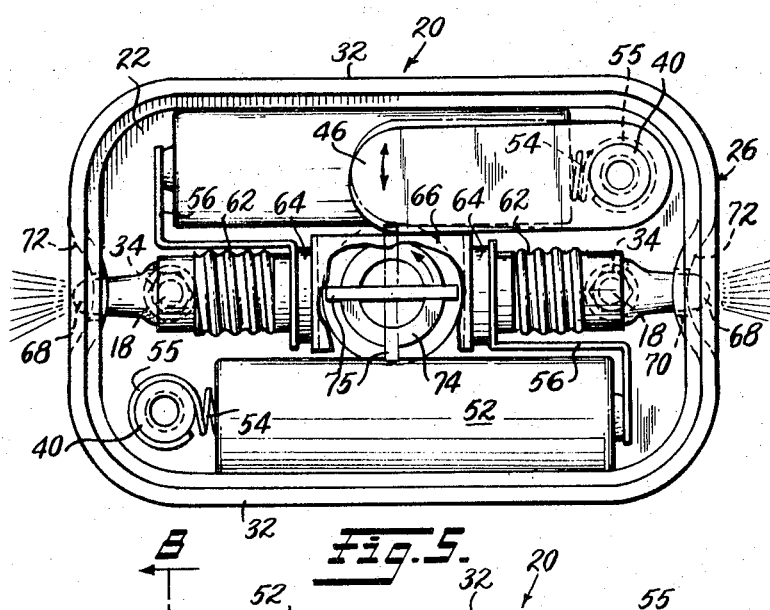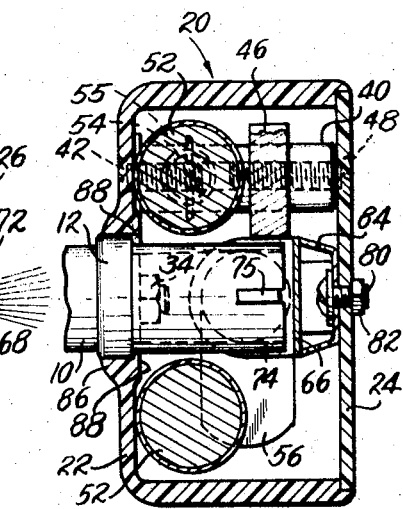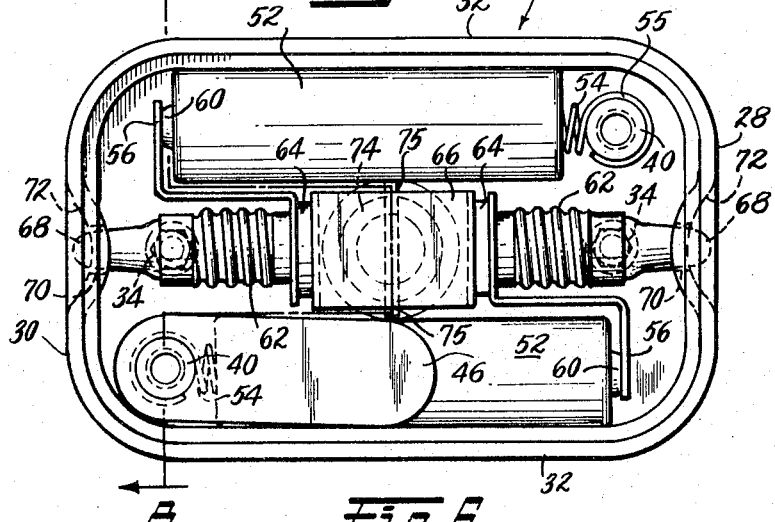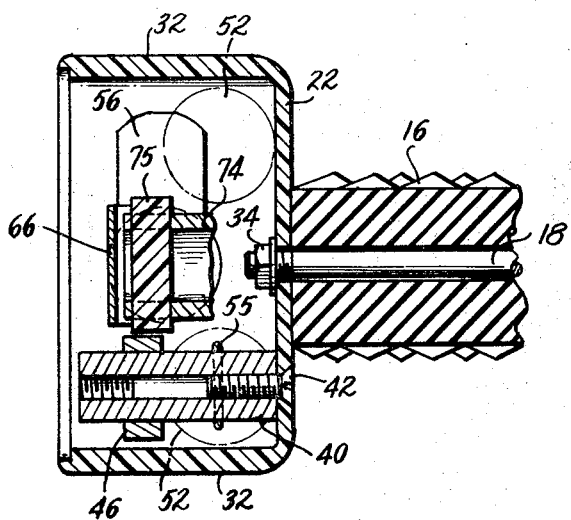

PEDAL MOUNTED SIGNAL LIGHT

CROSS REFERENCE TO RELATED APPLICATIONS

This is a continuation of application Ser. No. 771,475, filed Oct. 29, 1968, and now abandoned.

The present invention is an improvement on the devices disclosed in my prior U.S. Pat. Nos. 2,493,491, 2,732,540, 2,732,541 and 2,767,391.

BACKGROUND OF THE INVENTION

This invention is in the field of signal lights attachable to bicycle pedals whereby to indicate to motorists, or others, the presence of a bicycle on the road.

It has long been recognized that bicycles on a highway present a hazard to motorists and the bicyclist, particularly at night, and many proposals have been presented heretofore for providing suitable signal lights or reflectors on the bicycle so that its presence will be readily perceived by motorists. My prior patents disclose devices for providing a signal light on the outer ends of the bicycle pedals to thus provide a moving light more readily perceptible at night and switch means to cause the lights to blink off and on as the bicycle is moving. In most prior art devices, however, battery-powered lights made it necessary to provide housing space for the batteries and this was usually accomplished by redesigning the entire bicycle pedal, making it necessary to replace the entire pedal to install the lights.

SUMMARY OF THE INVENTION

The present invention comprises a unitary completely contained accessory adapted to be mounted on a bicycle pedal by merely replacing the outer pedal plate with a translucent housing containing batteries, lights, and suitable switch means. Thus, the accessory involves only the replacement of one small part of a conventional pedal and eliminates the necessity of replacing the entire pedal, which renders the improvement less expensive and available to a greater number of users. This not only reduces the cost of the accessory but also facilitates its installation. The accessory is completely housed in a translucent plastic housing, preferably of a red color, and the signal lights project part way through opposite ends of the housing so as to be supported thereby and to direct sharp beams forwardly and rearwardly of the bicycle while at the same time causing the entire housing to glow to be clearly and readily visible from any direction. The arrangement is extremely compact and of such relatively small size as to keep the lateral projection from the pedal to a minimum, which is of importance when turning, and of such simplicity as to be easily serviced and maintained by youthful users.

BRIEF DESCRIPTION OF THE DRAWINGS

FIG. 1 is a side elevation of a bicycle equipped with the accessory of the present invention;

FIG. 2 is a top plan view of a bicycle pedal having the present accessory mounted thereon;

FIG. 3 is an end view of the pedal of FIG. 2;

FIG. 4 is a side view of FIG. 2;

FIG. 5 is a somewhat enlarged view of the accessory with the casing cover removed showing the parts in one relative position;

FIG. 6 is a view similar to FIG. 5 but showing the parts in a different position and with certain parts modified;

FIG. 7 is an enlarged sectional view taken substantially along the line 7—7 of FIG. 3; and FIG. 8 is a sectional view taken along the line 8—8 of FIG. 6.

DESCRIPTION OF A PREFERRED EMBODIMENT

FIG. 1 shows a conventional bicycle 2 having the usual crank arms 4 on which conventional pedals 6 are journalled. As is customary, the pedals 6 comprise a central tubular member 8 (see FIG. 2) in which a crank pin or spindle 10 is journalled by means of bearings in the end portions 12 of member 8. At its inner end the pedal is provided with an end plate 14 to the ends of which rubber tread members 16 are secured by bolts or the like 18. In a conventional bicycle pedal the bolts 18 extend outwardly through another or outer end plate (not shown) which may be substantially identical to the end plate 14 already referred to.

The accessory of the present invention is completely self-contained within a casing 20. The casing 20 is provided with a back wall 22 provided with a pair of openings, to be referred to later. To install the accessory it is only necessary to remove the outer end plate of the bicycle pedal and replace the same with the casing 20, the rear wall of which performs the functions of the replaced pedal end plate and thus fixedly supports the accessory on the outer end of the pedal. The casing 20 is formed of separable portion 24 (serving as a cover) and a body portion 26 which defines end walls 28 and 30 and side walls 32.

Referring now to FIGS. 5 to 8, FIGS. 5 and 6 show the device mounted on a bicycle pedal with the cover 24 removed. Both portions 24 and 26 of the casing are preferably formed of a translucent plastic material and are further preferably tinted to be red in color.

As shown in FIGS. 5 and 6, the back wall 22 having the openings previously mentioned is mounted at the outer end of the bicycle pedal by means of the bolts 18 which are provided with suitable nuts 34 within the housing 20 to secure the same in the described mounted position. A spacer 40 is secured within the housing by means of a screw 42. At its outer end each post 40 defines a bearing portion on either one of which a pendulous or gravity-actuated switch contact element 46 is journalled for free swinging movement under the influence of gravity. The switch contact 46 may be selectively positioned on either post 40. FIGS. 5 and 6 illustrate the shape and nature of the element 46 in more detail. The posts 40 are internally threaded and serve to secure the cover portion 24 of the casing 20 in place, by means of screws 48, as seen in FIGS. 3 and 7. Note that cover 24 is recessed in the outer open end of casing 20, which arrangement enhances mechanical strength and provides an effective weather seal. The screws 48 are removable to release the cover 24 and to render the interior of the casing accessible. Within the housing 20 and adjacent the side walls 32 is a pair of batteries or dry cells 52, one adjacent each side wall. A spring 54 bears against the base of each dry cell 52 and also bears against an adjacent post or spacer 40. As shown, each spring 54 is formed with retaining loop portion 55 embracing its associated post 40.

A removable assembly comprises a pair of conductor members 56 in the shape of Z-shaped brackets shaped for engagement with the center terminal 60 of a respective one of the batteries 52. At their other ends the brackets 56 support lamp socket shells 62 and are in electrical contact therewith. The usual center contact of each socket is insulated from its shell 62 and extends through the brackets 56 and through insulating spacers 64 into electrical engagement with a generally U-shaped resilient connector conductor 66 and to which they are secured. Thus, the brackets 56, sockets 62, spacers 64, and conductor 66 constitute a single and separate assembly. Flashlight bulbs 68 are screwed into the sockets 62 and are of the type provided with lens-defining outer ends which ends extend through openings 70 in the end walls 28 and 30 to removably support the assembly in the described position within the housing. As shown in FIGS. 5 and 6, the end walls 28 and 30 of the casing 20 are provided with the openings 70 in the bottoms of dimples or depressions 72 formed in the casing. The depressions 72 serve to protect the ends of the bulbs and also function as light reflectors.

It will be apparent that when the bulbs 68 are energized or lighted, they will project rather sharp light beams forwardly and rearwardly but at the same time light emanating from the sides of the bulbs will cause the entire casing to appear lighted and to "glow" to provide a large area of red light visible from all lateral directions.

Fixed to the outer end of the spindle or crank pin 10 (see FIG. 7) is a cam carrier member 74, secured to the end of the spindle 10 by means of a threaded connection (not shown) engaging the usual threaded end on the conventional spindle member. The cam carrier member 74 is provided with nonconductive cam projections 75 thereon. In FIG. 5, the member 74 is shown as being provided with four such projections whereas in FIG. 6, it is shown as being provided with only two. It is apparent, however, that any desired number of projections may be provided or they may all be omitted if desired.

The gravity actuated switch contact element 46, previously referred to, extends from its mounting post 40 generally along a side wall of the casing 20 to a position somewhat past the axis of the cam member 74 and is swingable on its post toward or away from an edge portion of the conductive connector 66. Thus, a single switch contact element serves to control both bulbs 68.

When the pedal is rotated on its spindle 10 to the position of FIG. 6, wherein the switch contact member 46 is near the bottom of the casing, gravity acts to swing that switch contact member downwardly out of contact with the connector conductor 66 and the bulbs 68 are thus not energized since the circuits therethrough are open. Note that, due to that eccentric weight provided by member 46, the pedal will swing to assume the position of FIG. 6, when released and free to swing on spindle 10. It is also to be noted that portions of the circuits for energizing the bulbs extend from the base of the batteries, to the posts 40 and thence to the switch element 46. The central electrodes of the batteries are electrically connected to the shells 52 of the lamp sockets but the central contacts of the lamp sockets are connected only to the conductive connector 66. Thus, the circuits through the lamp bulbs can be completed by engaging switch contact member 46 with the conductor 66 and can be broken by separating switch contact member 46 from the conductor 66, as is the case in FIG. 6. Thus, the signal lights remain unlighted as long as the bicycle is operated with the pedal turned to the position of FIG. 6.

To activate the signal lights, it is only necessary for the bicycle rider to turn the pedals over, about spindles 10, to the position of FIG. 5 wherein the switch contact element 46 is uppermost and gravity urges the same to swing downwardly to the full line position of FIG. 5 wherein the switch contact element electrically engages the connector conductor 66 to complete circuits through the light bulbs. In this position, however, the lower edge of the switch contact element 46 is in the path of rotary movement of cam projections 75. It will be obvious that as the rider propels his bicycle along the road by rotating the crank elements 4, there will be relative rotation between the cam carrier member 74 and the casing 20. This causes the cam projections 75 to sequentially engage the switch contact member 46 and periodically lift the same out of contact with conductor 66 and thereafter lower the same to reestablish such contact. In this manner the bulbs 68 are caused to blink off and on at regular intervals as the bicycle progresses along its path. In cases where the projections 75 are omitted, the lights remain on constantly, without blinking, as is required in some countries.

As best seen in FIG. 7, the cover is provided with a small screw 80 extending therethrough and secured in place by a nut 82. The screw 80 secures a resilient clip 84 to the inner face of the cover 24 in position to make electrical contact with the connector conductor 66, previously described, when the cover is in place. This provides an electrical connection to the central contact of the sockets 62 and which connection is accessible from the outside of casing 20 without opening the same. As already described, the bases of the batteries 52 are in electrical contact with posts 40 which in turn are electrically connected to the screws 42 and 48 which are externally accessible. Thus, any suitable battery recharging device may be connected to the bolt 80 and to any accessible screw 42 or 48 for purpose of recharging the batteries 52 without removing the same from the casing 20. With the arrangement shown, the bulbs 68 must be in place since their filaments constitute a portion of the battery recharging circuit. If desired, the spring clip 84 could be arranged to engage the brackets 56 or socket shells 62, instead of conductor 66, in which case the batteries could be recharged without going through bulbs 68.

When a bulb 68 must be replaced the cover can be removed and by flexing connector 66 slightly the tips of bulbs 68 can be withdrawn inwardly and the bulb and socket assembly removed from the housing. The batteries 52 are held in position by suitable lugs (not shown) on the inner face of the cover 24.

As shown in FIG. 7, the back wall 22 of housing 20 is provided with a thickened boss 86 arranged to receive and house bearing enlargement 12 to provide an effective weather seal. The inner end of enlargement 12 abuts lugs 88 formed integrally with housing 20.

From the foregoing description it is apparent that I have provided a signal light accessory that is simple and economical to produce, easily installed, adding only a minimum length to a bicycle pedal, easily serviced and maintained by youthful users and yet providing greater visibility in all directions.

While a single specific embodiment of the invention has been shown and described herein, the same is merely illustrative of the principles involved and other embodiments may be resorted to within the scope of the appended claims.

What I claim is:

1. A signal light accessory comprising: a housing of translucent material having a back wall and opposed end walls and side walls; means for fixedly attaching said back wall to the outer end of a bicycle pedal; an opening in each of said end walls; a lamp socket in said housing adjacent each of said openings; a lamp bulb in each socket and partially projecting through the adjacent opening; battery means in said housing; and circuit means for connecting said battery means to said sockets, each of said sockets comprising a shell portion electrically connected to one side of said battery means and a central contact insulated from said shell, and said circuit means including: a conductive connector joining said central contacts of said sockets; and a gravity actuated switch means in said housing, comprising a single contact adapted to engage said conductive connector.

2. A signal light accessory as defined in claim 1 wherein said battery means comprises dry cells arranged along said side walls, said sockets and bulbs being centrally positioned in said housing between said dry cells.

3. A signal light accessory as defined in claim 1, including conductor means extending to the exterior of said housing and connected to respectively opposite sides of said battery means whereby said battery means may be recharged without opening said housing.

4. A signal light accessory as defined in claim 1 wherein said gravity actuated switch means is eccentrically positioned in said housing to thereby urge said housing to respond to gravity and assume a position with said switch means lowermost and said battery means and lamp bulbs disconnected.

5. A signal light accessory as defined in claim 1 wherein the ends of said bulbs extend into said openings in opposed end walls of said housing whereby said bulbs, sockets, and connector are supported in said housing solely by said openings.

6. A signal light accessory as defined in claim 1 wherein said back wall is formed to define a central relatively thick boss, and an opening through said boss adapted to sealingly embrace a supporting portion of a bicycle pedal.

* * * * *